(12) United States Patent
Liu

(10) Patent No.: US 10,877,616 B2
(45) Date of Patent: Dec. 29, 2020

(54) SENSING METHOD OF A TOUCH SENSING ANTENNA OF A TOUCH DEVICE AND TOUCH SENSING ANTENNA STRUCTURE OF A TOUCH DEVICE

(71) Applicant: Chih-Ming Liu, New Taipei (TW)

(72) Inventor: Chih-Ming Liu, New Taipei (TW)

(73) Assignee: Chih-Ming Liu, New Taipei (TW)

( * ) Notice: Subject to any disclaimer, the term of this patent is extended or adjusted under 35 U.S.C. 154(b) by 0 days.

(21) Appl. No.: 15/976,870

(22) Filed: May 11, 2018

(65) Prior Publication Data

US 2018/0335886 A1 Nov. 22, 2018

(30) Foreign Application Priority Data

May 17, 2017 (TW) .............................. 106116263 A

(51) Int. Cl.
  *G06F 3/046* (2006.01)
  *G06F 3/044* (2006.01)
  *G06F 3/041* (2006.01)

(52) U.S. Cl.
  CPC .............. *G06F 3/046* (2013.01); *G06F 3/044* (2013.01); *G06F 3/04166* (2019.05); *G06F 2203/04106* (2013.01)

(58) Field of Classification Search
  CPC ........ G06F 3/0416; G06F 3/046; G06F 3/044; G06F 2203/04106
  See application file for complete search history.

(56) References Cited

U.S. PATENT DOCUMENTS

| | | | | |
|---|---|---|---|---|
| 2011/0216032 A1* | 9/2011 | Oda | ...................... | G06F 3/044 345/174 |
| 2013/0321295 A1* | 12/2013 | Lin | ...................... | G06F 3/0416 345/173 |
| 2014/0306925 A1* | 10/2014 | Yeh | ...................... | G06F 3/0416 345/174 |
| 2015/0042600 A1* | 2/2015 | Lukanc | ................. | G06F 3/0412 345/174 |
| 2016/0124562 A1* | 5/2016 | Lu | ......................... | G06F 3/046 345/174 |

(Continued)

FOREIGN PATENT DOCUMENTS

| | | |
|---|---|---|
| CN | 201435623 Y | 3/2010 |
| CN | 201654756 U | 11/2010 |
| DE | 202009010764 U1 | 12/2009 |

(Continued)

*Primary Examiner* — Liliana Cerullo

(57) ABSTRACT

A sensing method of a touch sensing antenna of a touch device and a touch sensing antenna structure of a touch device, which provide a wire-free electromagnetic touch antenna circuit having a tandem line and a plurality of branch lines on a touchpad. The tandem line is disposed on the touchpad, the branch lines are respectively connected to the tandem line, and each of the branch lines is connected to a controller. The controller is set to make two of the branch lines with a regular interval to form a loop, then, all combinations of two of the branch lines that can form the loop are formed once within a cycle time, and complete one scan of the touchpad; then the touchpad is repeatedly scanned repeatedly through the mentioned cycle time so that the touch pen can be interpreted at any time and at any point of the touchpad.

6 Claims, 6 Drawing Sheets

(56) References Cited

U.S. PATENT DOCUMENTS

2017/0123569 A1* 5/2017 Kim .................... G06F 3/04166

FOREIGN PATENT DOCUMENTS

| | | |
|---|---|---|
| DE | 202009014764 U1 | 4/2010 |
| JP | 3152815 U | 7/2009 |
| JP | 3156959 U | 1/2010 |
| TW | I403066 B1 | 7/2013 |
| TW | I453629 B | 9/2014 |

* cited by examiner

A. providing an antenna structure without overlapping wires.

B. electrically connecting antenna pins to a controller.

C. driving the partial antenna structure by the controller to form an electromagnetic touch sensing loop for high frequency scanning.

SENSING METHOD OF A TOUCH SENSING ANTENNA OF A TOUCH DEVICE AND TOUCH SENSING ANTENNA STRUCTURE OF A TOUCH DEVICE

This application claims the benefit of the priority based on Taiwan Patent Application No. 106116263 filed on May 17, 2017, the disclosures of which are incorporated herein by reference in their entirety.

CROSS-REFERENCES TO RELATED APPLICATIONS

Not applicable.

BACKGROUND OF THE INVENTION

Field of the Invention

The present invention relates to a sensing method of a touch sensing antenna of a touch device and a touch sensing antenna structure of a touch device; and more particularly, to an application method and structure of a touch antenna for a touch device capable of streamlining processes and improving the yield.

Descriptions of the Related Art

With the development of electronic technology, the input type of the human-machine interface has also increased. In order to pursue the intuitive operation and improve the relative convenience, the touch input method is widely used in various types of electronic products.

In general, touch input types include the electromagnetic touch, the resistive touch, and the capacitive touch. Among them, the electromagnetic touch is the interaction between the touchpad and the magnetic digital pen to obtain the corresponding input signal, and the sensing antenna is usually laid on the touchpad in a two-dimensional array. The operation principle of the electromagnetic touch is by sensing the difference in distance between the touchpad and the magnetic digital pen, the magnetic force between the sensing antenna and the magnetic digital pen thus changes accordingly, and then the position of the magnetic digital pen on the touchpad can be obtained according to the changes of the magnetic force of the sensing antenna.

However, in the prior art, the arrangement of the electromagnetic touch antenna is mainly paralleling through a plurality of antenna loops, and the antenna loops overlap with each other and are arrayed on a touch panel. The overlapping of the adjacent sensing antenna loops must be staggered with each other through bypass lines to avoid the lines turn on directly with each other. Therefore, when the number of sensing antenna loops on one touchpad increase, there must be more intersections having the bypass lines.

On the touchpad, when the mentioned bypass line structures of the antenna loop increases, the production complexity of the product also increases. Accordingly, it also makes the production costs and production hours increase, and makes the structure of the circuit more complicated, which means that the yield of the process may be reduced.

Further, the sensing antenna and the sensing coil respectively used in the electromagnetic touch and the capacitive touch belong to different architectures. Therefore, in the prior art, to combine the two touch methods, it needs to place a sensing antenna and a sensing coil separately on the touchpad. Since the sensing antenna and the sensing coil belong to two layers, and the touchpad has its own thickness, it is difficult to reduce the size of electronic device, and may has problems such as increased production costs and the like.

In view of the above, the inventors of the present invention pondered and designed the touch sensing method of the touch sensing antenna of the touch device and the touch sensing antenna structure of the touch device, aiming at improving the lack of the prior art, and further increasing industrial implementation.

SUMMARY OF THE INVENTION

In view of the above-mentioned deficiencies of the prior art, the present invention is to design a sensing method of a touch sensing antenna of a touch device and a touch sensing antenna structure of a touch device with patentability, novelty and industrial utilization, for overcome the difficulties of the prior art.

To achieve the aforesaid objective, the technical means adopted of the present invention is to design a sensing method of a touch sensing antenna of a touch device, including the following steps: A. providing an antenna structure without overlapping wires, which provides a wire-free electromagnetic touch antenna circuit on a touchpad, the wire-free electromagnetic touch antenna circuit includes a tandem line and a plurality of branch lines; wherein the tandem line is disposed on the touchpad; and wherein the branch lines are respectively connected to the tandem line; B. electrically connecting antenna pins to a controller, which is to electrically connect each of the branch lines to the controller, and the controller has the function that can turn on any two of the branch lines so as to make one as a conducting end and another as a grounding end, thereby forming a loop; besides the two branch lines, the controller also makes other branch lines floated, and thus the loop can be used as a sensing loop for sensing a touch pen; and C. driving the partial antenna structure by the controller to form an electromagnetic touch sensing loop for high frequency scanning, wherein the controller is set to make two of the branch lines having a regular interval to form the loop; then, all combinations of two of the branch lines that can form the loop are formed once within a cycle time, and complete one scan of the touchpad; the touchpad is then repeatedly scanned by multiple cycle times so that the touch pen can be interpreted at any time and at any point of the touchpad.

In addition, on the touchpad, at least one capacitive touch antenna array is further disposed within the intervals of each branch lines.

In addition, each of the branch lines is equidistant from each other.

In addition, at step C (i.e. driving the partial antenna structure by the controller to form an electromagnetic touch sensing loop for high frequency scanning), the method of sensing the touchpad within the cycle time is: to form the loop sequentially from one side to another according to the arrangement order of the branch lines, or all combinations of two of the branch lines that can form the loop are randomly formed once.

The present invention further provides a touch sensing antenna structure of a touch device, including: a touchpad, which is a plate; a wire-free electromagnetic touch antenna circuit, disposed on the touchpad, wherein the wire-free electromagnetic touch antenna circuit includes a tandem line and a plurality of branch lines; wherein the tandem line is disposed on the touchpad; and wherein the branch lines are spaced apart and are respectively connected to the tandem line.

In addition, it may further includes at least one capacitive touch antenna array disposed within the intervals of each branch lines.

In addition, each of the branch lines is equidistant from each other.

The sensing method of the touch sensing antenna of the touch device and the touch sensing antenna structure of the touch device of the present invention are designed to achieve a method that can use extremely simple one-time circuit wiring on the touchpad, completely replace the winding problem that is difficult to avoid in the prior art, and obtain accurate touch proofreading efficiency, thereby greatly saving production cost and production time. In addition, because the production becomes easy and it is hard to produce flaws, the yield can be greatly improved.

And through such methods, the space can be further effectively utilized. The electromagnetic touch and capacitive touch can be arranged on the same touchpad, thereby effectively reducing the parts in the assembly space of the electronic device to further reduce the weight of electronic devices. The present invention has many advantages in practical application and cannot be achieved by the prior art.

DESCRIPTION OF THE PREFERRED EMBODIMENT

Figure 1:
FIG. 1 is a flow chart of a sensing method of a touch sensing antenna of a touch device and a touch sensing antenna structure of a touch device according to the present invention.
Figure 1:
Figure 2:
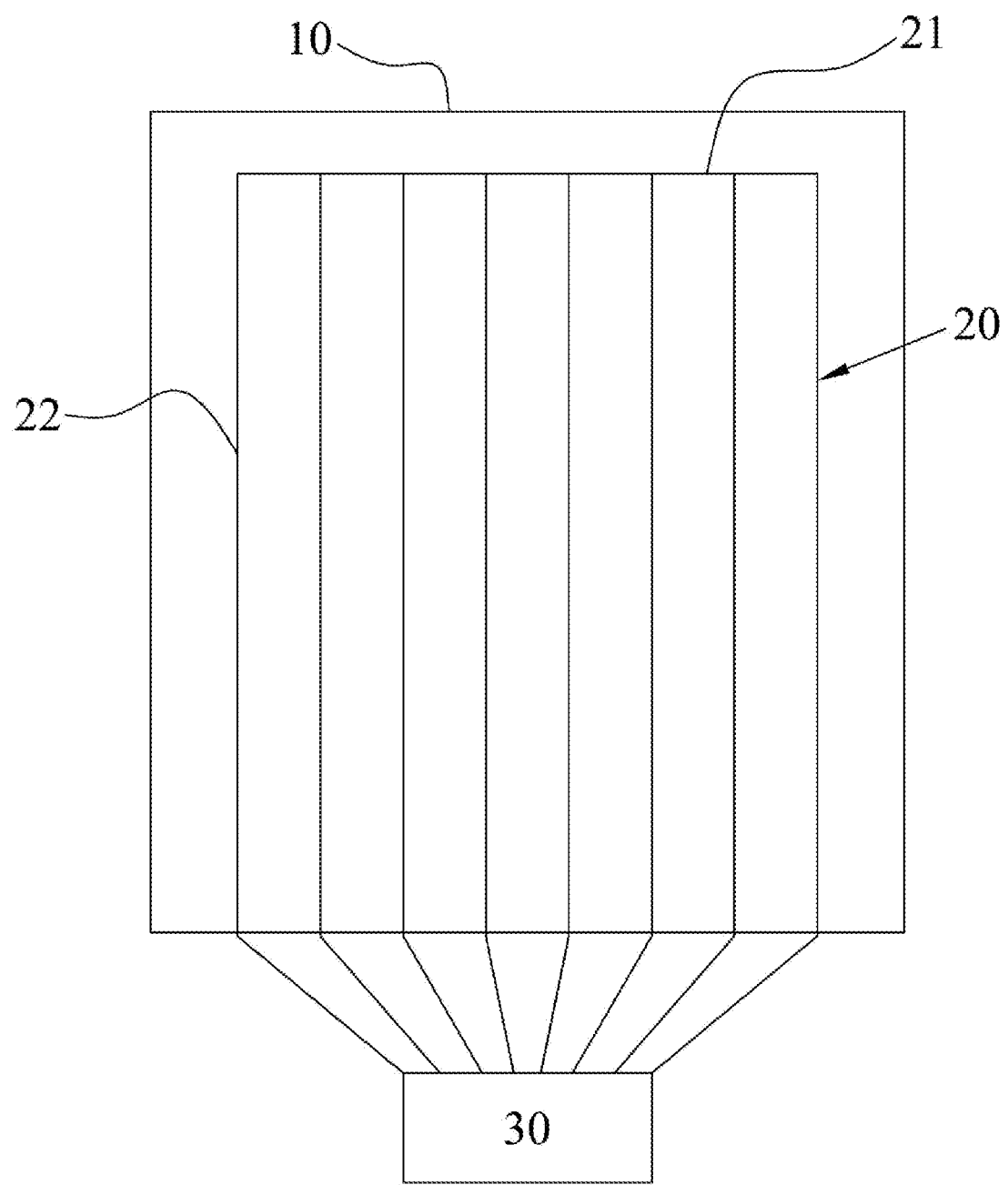
FIG. 2 is a schematic view of the sensing method of the touch sensing antenna of the touch device and the touch sensing antenna structure of the touch device according to the present invention.

Please refer to FIG. 1 and FIG. 2. As shown in FIG. 1 and FIG. 2, the present invention relates to a sensing method of a touch sensing antenna of a touch device, including the following steps:

A. providing an antenna structure without overlapping wires;

B. electrically connecting antenna pins to a controller; and

C. driving the partial antenna structure by the controller to form an electromagnetic touch sensing loop for high frequency scanning.

The mentioned step A (i.e. providing an antenna structure without overlapping wires) is to provide a wire-free electromagnetic touch antenna circuit 20 on a touchpad 10, the wire-free electromagnetic touch antenna circuit 20 includes a tandem line 21 and a plurality of branch lines 22. The tandem line 21 is disposed on the touchpad 10 and penetrates the area of the touchpad 10 to be touch-sensed. The branch lines 22 are respectively connected to the tandem line 21 with one end, and the branch lines 22 are arranged at equal intervals from each other.

Figure 3:
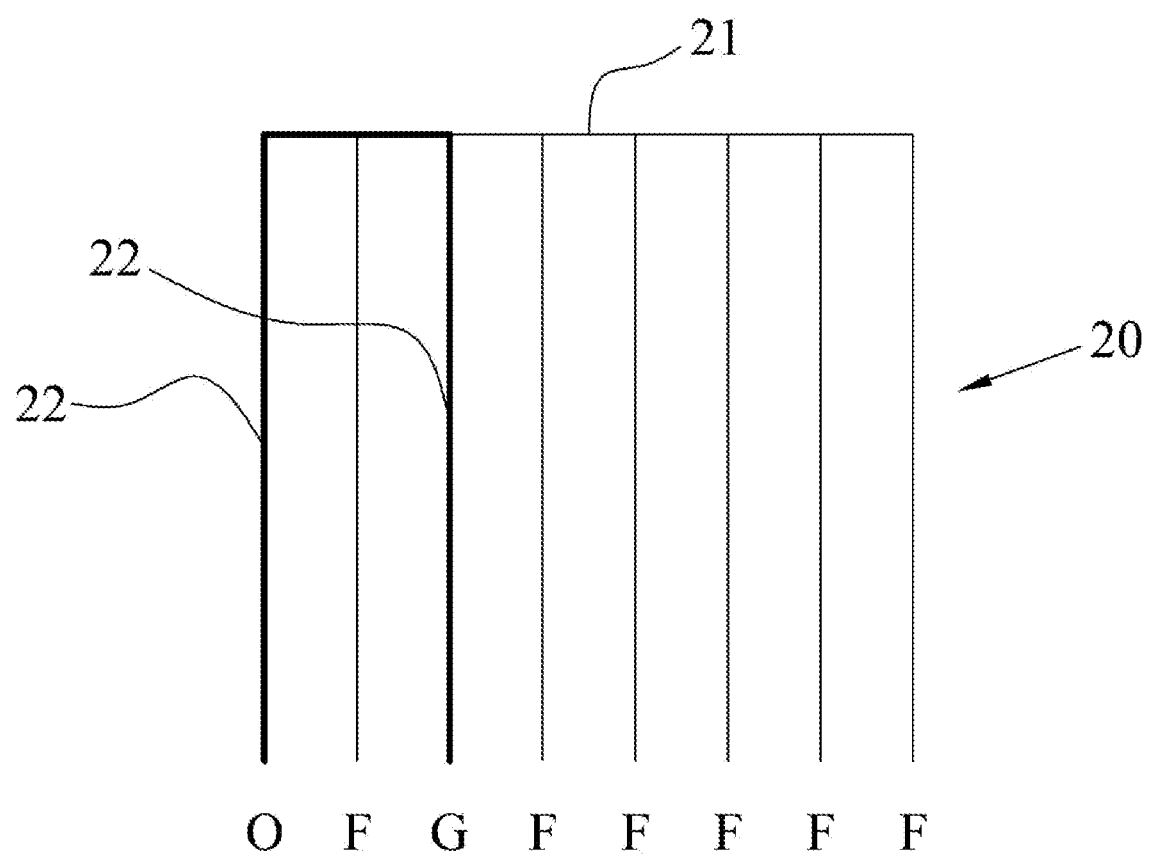
FIG. 3 is a schematic view of the sensing method of the touch sensing antenna of the touch device and the touch sensing antenna structure of the touch device according to the present invention.

Please further refer to FIG. 3, the mentioned step B (i.e. electrically connecting antenna pins to a controller) is to electrically connect another end of each branch lines 22 to a controller 30. The controller 30 includes the function that can turn on any two of the branch lines 22 to make one as a conduction (O) and another as a grounding (G), thereby forming a loop; besides the two branch lines 22, the controller 30 makes other branch lines 30 floated (F), and thus the loop can be used as a sensing loop for sensing a touch pen.

Figure 4:
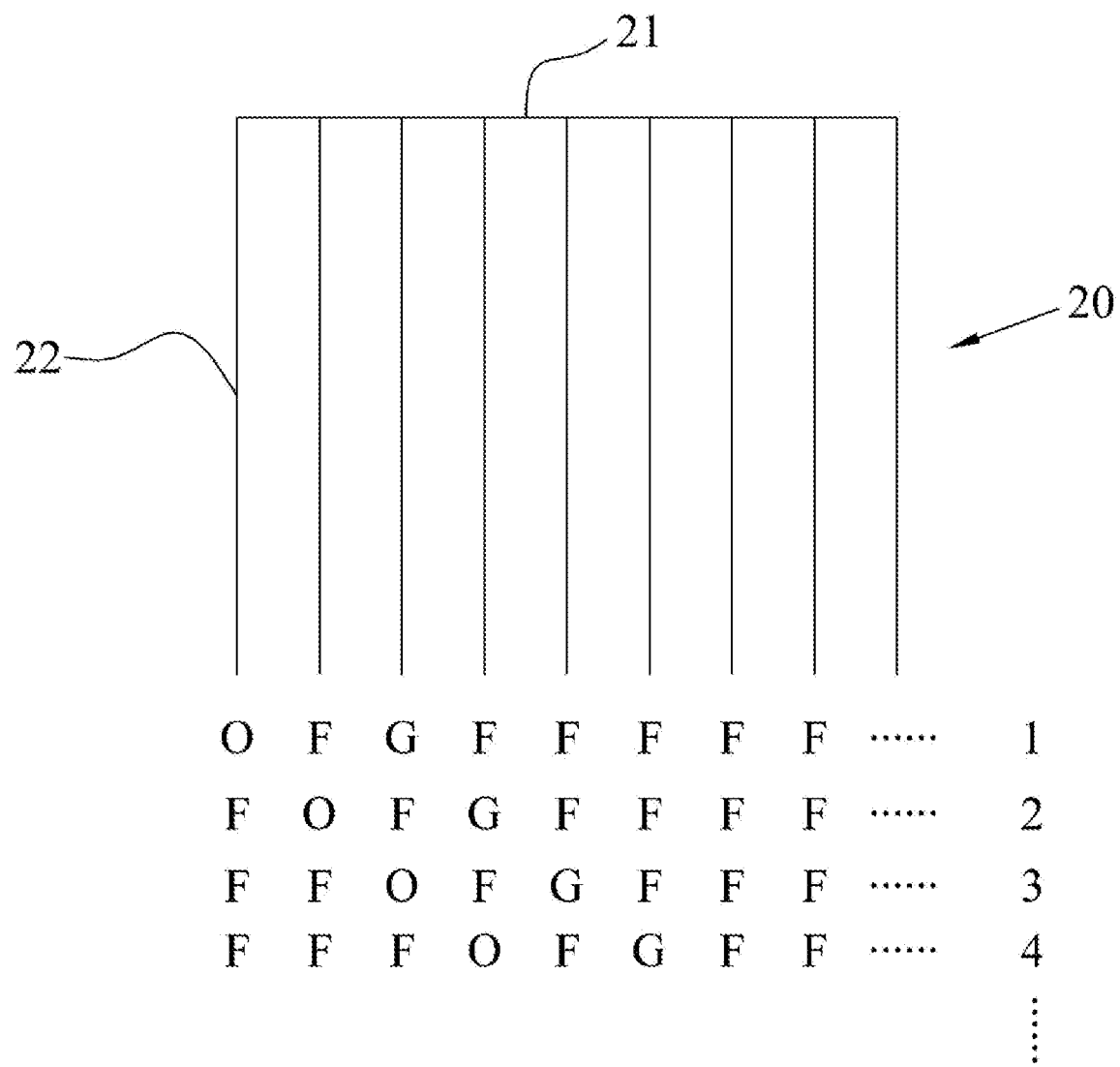
FIG. 4 is a schematic view of the sensing method of the touch sensing antenna of the touch device and the touch sensing antenna structure of the touch device according to the present invention.

Please further refer to FIG. 4, the mentioned step C (i.e. driving the partial antenna structure by the controller to form an electromagnetic touch sensing loop for high frequency scanning) is that within the branch lines 22, the controller 30 is set to make two of the branch lines 22 having a regular interval to form the loop; and then all combinations of two of the branch lines 22 that can form the loop are formed once within a cycle time, and complete one scan of the touchpad 10. The scanning may be based on the order of the branch lines 22, forming the loop sequentially from one side to the other, or randomly forming the loop (as shown in FIG. 4, the loop is formed from left to right); and then continuously repeat a plurality of cycle times to repeatedly scan the touchpad 10 so that when scanning is performed, the positioning function can be performed when sensing the touch pen.

Figure 5:
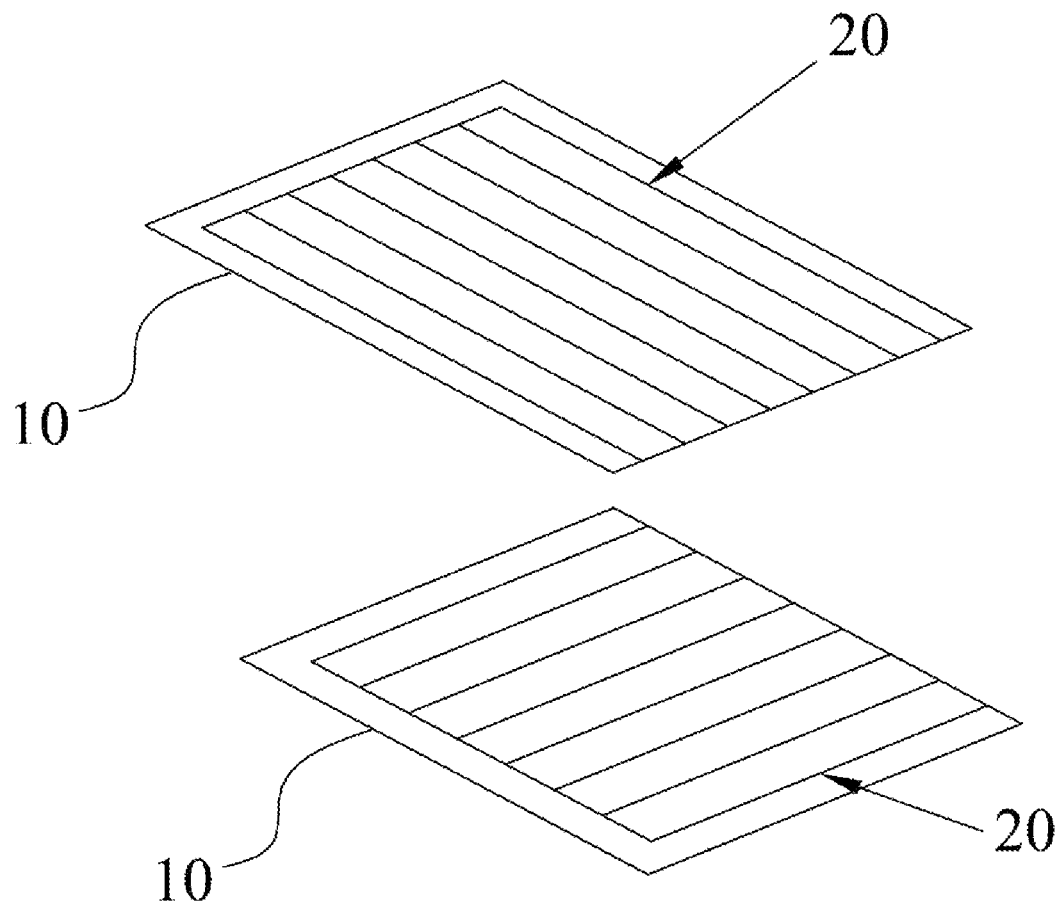
FIG. 5 is a schematic view of another embodiment of the sensing method of the touch sensing antenna of the touch device and the touch sensing antenna structure of the touch device according to the present invention.

Please further refer to FIG. 5, the preferred application of the present invention is that two planar scans can be performed through two mutually perpendicular touchpads 10 to achieve accurate positioning.

Figure 6:
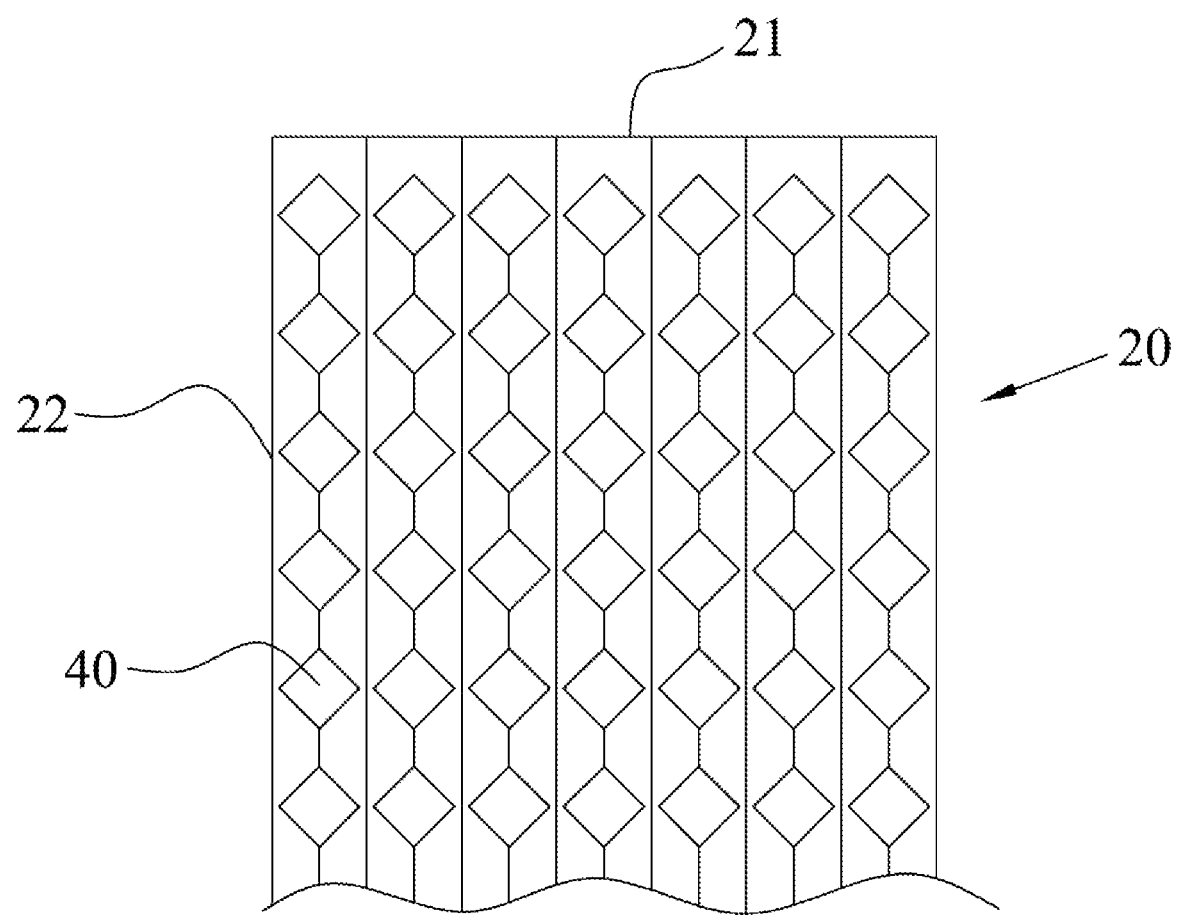
FIG. 6 is a schematic view of the deformation embodiment of the sensing method of the touch sensing antenna of the touch device and the touch sensing antenna structure of the touch device according to the present invention.

In addition, please further refer to FIG. 6, in another preferred embodiment of the present invention, on the touchpad 10, at least one capacitive touch antenna series 40 is disposed in the intervals within the branch lines 22, so that to achieve effective use of space, and achieve the purpose that integrate the electromagnetic touch and the capacitive touch on a plate.

In summary, the present invention further provides a touch sensing antenna structure of a touch device, which includes a touchpad 10, a wire-free electromagnetic touch antenna circuit 20, and at least one capacitive touch antenna series 40.

The mentioned touchpad 10 is a plate.

The mentioned wire-free electromagnetic touch antenna circuit 20 is correspondingly disposed on the touchpad 10, wherein the wire-free electromagnetic touch antenna circuit 20 includes a tandem line 21 and a plurality of branch lines 22. The tandem line 21 is disposed on the touchpad 10 and penetrates the area of the touchpad 10 to be touch-sensed. The branch lines 22 are respectively connected to the tandem line 21 with one end, and the other end extends outward. The branch lines 22 are arranged at equal intervals from each other.

The mentioned capacitive touch antenna series 40 is disposed in the intervals within the branch lines 22.

The sensing method of the touch sensing antenna of the touch device and the touch sensing antenna structure of the touch device of the present invention are designed to achieve a method that can use extremely simple one-time circuit wiring on the touchpad 10, completely replace the winding problem that is difficult to avoid in the prior art, and obtain accurate touch proofreading efficiency, thereby greatly saving production cost and production time. In addition, because the production becomes easy and it is hard to produce flaws, the yield can be greatly improved.

And through such methods, the space can be further effectively utilized. The electromagnetic touch and capacitive touch can be arranged on the same touchpad 10, thereby effectively reducing the parts in the assembly space of the electronic device to further reduce the weight of electronic devices. The present invention has many advantages in practical application and cannot be achieved by the prior art.

What is claimed is:

1. A sensing method of a touch sensing antenna of a touch device, including the following steps:
   A. providing an antenna structure without overlapping wires, which provides a non-overlapping electromagnetic touch antenna circuit on a single touchpad, the non-overlapping electromagnetic touch antenna circuit includes a tandem line and a plurality of branch lines; wherein the tandem line is disposed on the single touchpad; and wherein the branch lines are directly connected all at the same time to the tandem line;
   B. electrically connecting antenna pins to a controller, which is to electrically connect each of the branch lines to the controller, the controller includes the function that can turn on any two of the branch lines so as to make one as a conducting end and another as a grounding end, thereby forming a loop; besides the two branch lines, the controller makes other branch lines floated, and thus the loop can be used as a sensing loop for sensing a touch pen; and
   C. driving a partial antenna structure by the controller to form an electromagnetic touch sensing loop for frequency scanning, wherein the controller is set to make two of the branch lines having a regular interval to form the loop; then, all combinations of two of the branch lines that can form the loop are formed once within a cycle time, and complete one scan of the single touchpad, then the single touchpad is repeatedly scanned through the mentioned cycle time so that the touch pen can be interpreted at any time and at any point of the single touchpad,
   wherein two single touchpads are disposed to be mutually perpendicular for scanning,
   wherein on the single touchpad, at least one capacitive touch antenna array is further disposed within the intervals of and the at least one capacitive touch antenna array is not connected to the tandem line.

2. The sensing method of the touch sensing antenna of the touch device as claimed in claim 1, wherein each of the branch lines is equidistant from each other.

3. The sensing method of the touch sensing antenna of the touch device in claim 2, wherein at step C, the method of sensing the single touchpad within the cycle time is: to form the loop sequentially from one side to another according to the arrangement order of the branch lines.

4. The sensing method of the touch sensing antenna of the touch device in claim 2, wherein at step C, the method of sensing the single touchpad within the cycle time is: all combinations of two of the branch lines that can form the loop are randomly formed once.

5. A touch sensing antenna structure of a touch device that performs the method of claim 1.

6. The touch sensing antenna structure of the touch device as claimed in claim 5, wherein each of the branch lines is equidistant from each other.

* * * * *